June 4, 1968   R. O. ENGH   3,387,135
FIRE DETECTION AND FLAME SAFEGUARD APPARATUS
Filed July 26, 1965

*INVENTOR.*
ROBERT O. ENGH
BY
ATTORNEY

United States Patent Office 3,387,135
Patented June 4, 1968

3,387,135
FIRE DETECTION AND FLAME SAFEGUARD APPARATUS
Robert O. Engh, Hopkins, Minn., assignor to Honeywell Inc., Minneapolis, Minn., a corporation of Delaware
Filed July 26, 1965, Ser. No. 474,596
10 Claims. (Cl. 250—83.6)

ABSTRACT OF THE DISCLOSURE

Self-checking apparatus for detecting either the presence or absence of radiation having a radiation sensor connected across a full wave rectifier bridge. The radiation sensor is exposed during alternate half cycles of the AC supply to first the condition to be detected and second to a condition for checking proper functioning of the apparatus. An output indicative of the presence of the condition to be detected or of the malfunctioning of the apparatus is obtained from relays in two adjacent legs of the rectifier bridge.

---

This invention is concerned with an improved self-checking condition detecting apparatus and particularly with such an apparatus utilizing a radiation condition sensing element. By virtue of the circuit means used with the condition sensing element, the element is exposed during alternate time intervals to the condition to be detected and to a time interval for self-checking. The apparatus provides an output indicative of the presence of the condition to be detected or of the failure of the apparatus.

This invention may utilize a Geiger tube which is responsive to ultraviolet radiation in a flame or it may use other radiation or condition responsive elements as will be obvious to those skilled in the art.

By "Geiger tube" is meant a condition sensor having an anode and a cathode disposed in an ionizable gas, and which, upon being subject to a condition to which it is sensitive, causes an electron to be present within the electric field established by the anode and cathode, whereupon the electron accelerates toward the anode, ionizing the gas, and causing a discharge current to flow, which current is subsequently quenched by a quenching means.

The invention has particular utility when utilized as a flame detector portion of a combustion safeguard apparatus or as a fire detector apparatus or alarm per se. In a preferred embodiment, it is a photocell actuated fire or flame detector although, the invention may be extended by those skilled in the art to other condition detecting devices.

More specifically, the apparatus of this invention, when utilized as a fire detector, is adapted to be connected to a source of AC such as a 110 volt, 60 cycle AC supply which is normally available. There is provided by the construction of this invention a cycling AC current which is applied through first and second circuit means to a Geiger tube or other condition detecting means. The Geiger tube has an anode and cathode disposed in an ionizable gaseous medium, with the anode and the cathode of the tube connected in series circuit with first and second output means in the first and second circuit means respectively. When the tube experiences an ionizing event, as by the presence of fire, it is rendered conductive to energize an appropriate output means. The Geiger tube must be arranged in the apparatus so as to be exposed to any fire which may be present in its surrounding environment. The tube is also arranged so as to be exposed to a simulated source of flame such as a UV source which is electrically operated and synchronized with the AC source that operates the detector apparatus. Thus, the Geiger tube is cyclically exposed to a simulated fire condition i.e., the UV source which is excited on alternate cycles of the AC source causing the tube to conduct current every other half cycle. The current for these discharges is drawn only through the first output means contained in the first circuit means. No current passes through the second output means contained in the second circuit means unless an actual fire is present which causes the Geiger tube to conduct current on the remaining half cycles. As long as the first output means remains energized, positive assurance may be had that the device will respond to fire when and if it occurs. Thus, there is provided a self-checking fire detector apparatus.

The construction of this invention when utilized as a flame detector portion of a combustion safeguard apparatus differs slightly from the embodiment described above. In such a construction the apparatus is again connected to an AC supply. Also, first and second circuit means including first and second output means are connected to a Geiger tube or other suitable condition responsive element. However, in place of the simulated source of radiation there is provided a means such as a synchronous motor or a shutter for modulating the receipt of radiation by the Geiger tube from the flame to be detected. This modulation means is arranged so as to expose the Geiger tube only on alternate half cycles of the AC supply. On those half cycles, the Geiger tube conducts current and energizes one of the output means. If the tube is activated on the other half cycles, it conducts current and energizes the second output means which serves to give notice of a malfunction by operating a suitable alarm system or the like. Thus, there is provided a self-checking flame safeguard apparatus.

The invention will be apparent to those skilled in the art upon reference to the following specification, claims and drawing of which:

Figure 1:
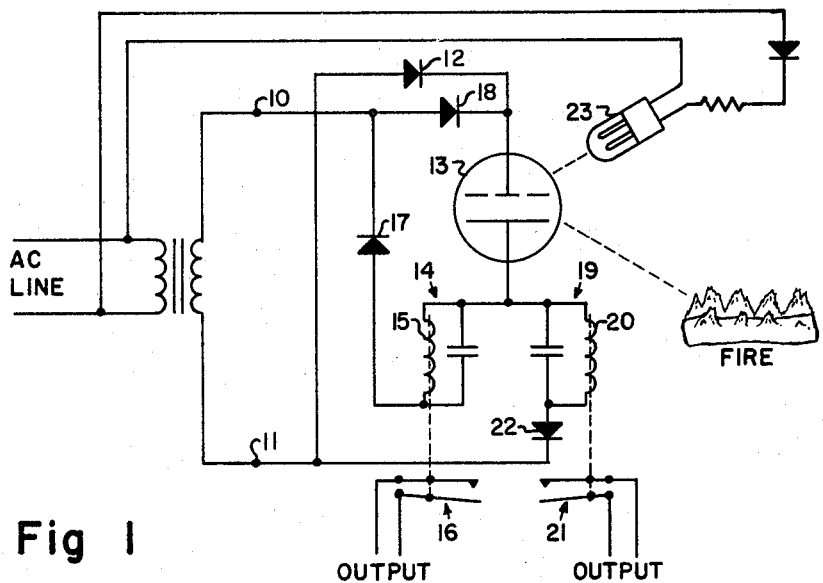
FIGURE 1 is a schematic representation of a fire alarm apparatus in accordance with the present invention.

Referring to FIGURE 1, reference numerals 10 and 11 designate power input terminals adapted to be connected to a source of AC current. A first circuit means is connected between terminals 10 and 11 and comprises diode 12, Geiger tube 13, first relay output means generally designated as 14 including a relay winding 15 and switch means 16, and diode 17. A second circuit means is connected between terminals 10 and 11 and comprises diode 18, Geiger tube 13, second relay output means generally designated as 19 including relay winding 20, switch means 21 and diode 22.

The first and second circuit means including diodes 12, 17, 18 and 22 actually comprise the legs of a rectifier bridge across the output terminals of which Geiger tube 13 is connected. Relays 14 and 19 are connected in adjacent legs of the bridge.

In actual use, Geiger tube 13 would be mounted and arranged in such a manner as to be exposed to any fire which may occur in its surrounding environment. Geiger tube 13 would also be mounted and arranged so as to be exposed to UV source 23 which simulates the fire to be detected. UV source 23 is shown connected to the AC source and synchronized therewith so as to be activated upon alternate half cycles thereof.

As can be seen in FIGURE 1, the anode of Geiger tube 13 is connected to the cathode of diode 12. Thus, Geiger tube 13 and diode 12 are connected in a circuit which conducts current only during alternate half cycles of the AC source to which terminals 10 and 11 are connected.

Also, as can be seen from FIGURE 1, the anode of Geiger tube 13 is connected to the cathode of diode 18.

Thus, Geiger tube 13 and diode 18 are connected in a circuit which conducts current only during opposite alternate half cycles of the AC source to which terminals 10 and 11 are connected. That is, these half cycles are opposite to the half cycles that make the circuit containing Geiger tube 13 and diode 12 current conductive.

In operation, on a first half cycle, UV source 23 is activated. On this same cycle, current flows through diode 12 to Geiger tube 13. Since tube 13 is activated by radiation of UV source 23, the tube conducts current and energizes first output means 14 which consists of a relay winding 15 and output switch means 16 adapted to be opened or closed upon energization of winding 15. For purposes of simplicity, switch 16 has been shown connected to conductors labeled "output." It is within the teachings of this invention to provide a plurality of switches to be used for any particular output function. The output of the first half cycle of the AC supply checks the Geiger tube and the overall apparatus to insure that it is operating properly. If it is, switch 16 will be maintained in an energized position.

On the second half cycle of the AC source, UV source 23 is de-activated. Current flows through diode 18 to Geiger tube 13. If fire is present, tube 13 conducts current and energizes relay output means 19 consisting of winding 20 and an output switch means 21. Switch means 21 may be adapted to be opened or closed upon energization of winding 19. Single switch 21 is shown here also for purposes of simplicity and it is within the teachings of the invention to provide a plurality of switches to be used for any particular output function.

Figure 2:
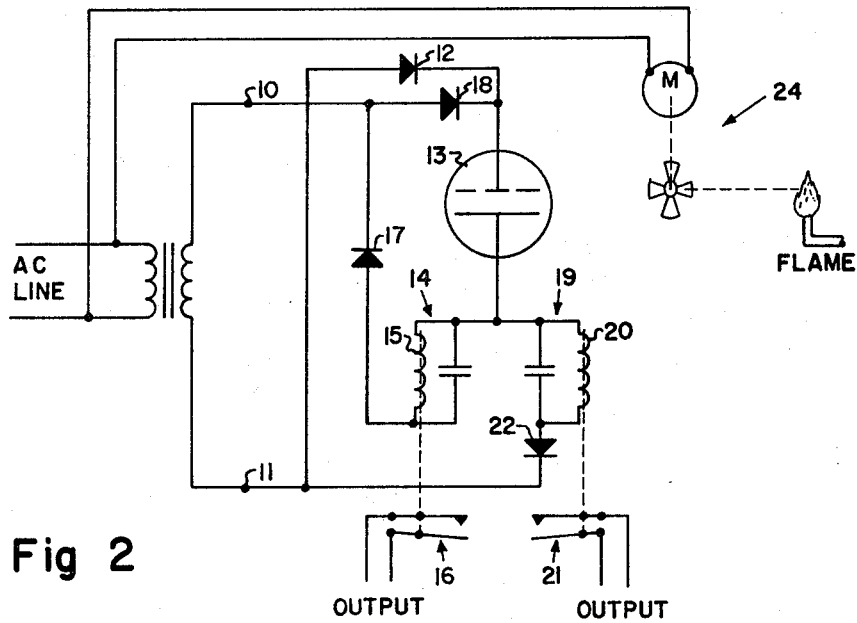
FIGURE 2 is a schematic representation of a flame safeguard apparatus in accordance with the present invention.

Considering the operation of the invention, as when the apparatus is adapted to be utilized in a flame safeguard application, reference is made to FIGURE 2. The structure of the apparatus of FIGURE 2 is essentially the same as that of FIGURE 1 with the exception that the simulated source of radiation 23 is replaced by a modulating means 24 such as a synchronous motor including a chopper which modulates the flame to be monitored.

Modulation means 24 is arranged to permit exposure of the UV tube 13 to the condition to be detected only on alternate half cycles of the AC supply. When terminal 11 is positive, and current is applied to Geiger tube 13 through diode 12, modulating means 24 is opened to allow the flame being monitored to activate tube 13 and energize first output means 14 and switch 16. On the other half cycles of the AC supply when terminal 10 is positive, if the Geiger tube fails due to shorting or spurious counts, second output means 19 and switch 21 are energized. In this apparatus, if operation is normal, the first output means 14 is normally energized and the second output means 19 normally is de-energized. If Geiger tube 13 fails and goes dead or if the flame is extinguished neither of the output means are energized. If Geiger tube 13 runs away or is shorted, both output means are energized. Thus, there is provided a fail safe, self-checking flame detector apparatus.

Modifications of this invention will be apparent to those skilled in the art. It is intended that the scope of the invention is to be limited by the scope of the appended claims.

What is claimed is:
1. A self-checking radiation detector for detecting radiation of a predetermined wavelength comprising:
 a rectifier bridge having output terminals and having input terminals adapted to be connected to an AC source, said bridge including electrically operable radiation sensing means connected to said output terminals, said sensing means being activated by the radiation to be detected to produce an electrical output, said bridge also including first and second electrically responsive output means connected in adjacent legs of said bridge for responding to the output of said sensing means, and
 means for simulating the radiation to be detected and adapted to be synchronized with the AC source to cause said sensing means to be subjected to the simulated radiation during synchronized time intervals.

2. A self-checking radiation detector for detecting radiation of a predetermined wavelength, comprising:
 a rectifier bridge having output terminals and having input terminals adapted to be connected to an AC source, said bridge including electrically operable radiation sensing means connected to said output terminals, and including first and second electrically responsive output means connected in adjacent legs of said bridge, and
 means for subjecting said sensing means to the radiation to be detected at periodic intervals.

3. Self-checking apparatus for detecting a predetermined condition, comprising:
 a rectifier bridge having output terminals and having input terminals adapted to be connected to an AC source, said bridge including an electrically operated condition sensor connected to said output terminals and first and second electrically responsive output means connected in adjacent legs of the bridge, and
 condition source means adapted to be synchronized with the AC source for periodically activating said condition sensor during predetermined time intervals.

4. A self-checking detector for detecting a predetermined condition, comprising:
 sensing means activated by the predetermined condition to produce an output;
 first power means including first output means cyclically connected to said sensing means during first time intervals for applying operating power to said sensing means and for producing an output only when said sensing means is activated during said first time intervals;
 second power means including second output means cyclically connected to said sensing means during second time intervals for applying operating power to said sensing means and for producing an output only when said sensing means is activated by the predetermined condition during said second time intervals, and
 means for subjecting said sensing means to the predetermined condition during said second time intervals.

5. A self-checking detector for detecting a predetermined condition comprising:
 sensing means activated by a predetermined condition or by a simulated condition having substantially the same characteristics as the predetermined condition to produce an output,
 first power means including first output means cyclically connected to said sensing means during first time intervals for applying operating power to said sensing means and for producing an output only when said sensing means is activated by the simulated condition during said first time intervals;
 second power means including second output means cyclically connected to said sensing means during second time intervals for applying operating power to said sensing means and for producing an output only when said sensing means is activated by the predetermined condition during said second time intervals, and
 means for simulating the predetermined condition during the first time intervals.

6. In combination:
 a pair of terminals adapted to be connected to a source of AC;
 condition sensing means becoming current conductive upon sensing a given condition;
 first and second current responsive means;
 first circuit means connected to said terminals and including said condition sensing means and said first current responsive means in series circuit, said first circuit means being constructed and arranged to conduct current and to energize said first current responsive means only when said condition sensing means senses a given condition during a first half cycle of the AC source;

second circuit means connected to said terminals and including said condition sensing means and said second current responssive means in series circuit, said second circuit means being constructed and arranged to conduct current and to energize said second current responsive means only when said condition sensing means senses a given condition during a second half cycle of the AC source, and condition source means adapted to be synchronized with said AC source for periodically activating said condition sensing means during alternate half cycles of said AC source.

7. The combination of claim 6 wherein:
the condition to be sensed is radiation;
said condition sensing means is radiation sensing means;
said condition source means comprises a radiation source means for producing radiation during a first half cycle of said AC source and simulating the actual radiation to be sensed during an opposite second half cycle of said AC source.

8. The combination of claim 7 wherein:
said condition sensing means is a Geiger tube having an anode and cathode disposed in an ionizable gaseous medium, said Geiger tube becoming current conductive from said anode to said cathode upon being subjected to radiation of the wave length to be detected;
said first and second current responsive means include first and second relays having windings and switch means respectively;
said first circuit means includes first diode means, whereby said first diode means, said first relay winding and said Geiger tube are connected in series to said terminals to cause conduction in said Geiger tube and to energize said first relay winding only when subjected to simulated radiation during a first half cycle of said AC source, and
said second circuit means includes second diode means, whereby said second diode means, said second relay winding and said Geiger tube are connected in series to said terminals to cause conduction in said Geiger tube and to energize said second relay winding only when subjected to the radiation to be detected during a second half cycle of said AC source.

9. The combination of claim 6 wherein:
the condition to be sensed is radiation;
said condition sensing means is a radiation sensing means, and
said condition source means includes modulation means synchronized with said AC source for modulating the radiation to be sensed so as to subject said Geiger tube to the radiation to be sensed only during alternate half cycles of said AC source.

10. The combination of claim 9 wherein:
said condition sensing means is a Geiger tube having an anode and cathode disposed in an ionizable gaseous medium, said Geiger tube becoming current conductive from said anode to said cathode upon being subjected to radiation of the wave length to be sensed;
said first and second current responsive means include first and second relays having windings and switch means respectively;
said first circuit means includes first diode means, whereby said first diode means, said first relay winding and said Geiger tube are connected in series to said terminals to cause conduction in said Geiger tube and to energize said first relay winding only when subjected to the radiation to be sensed during a first half cycle of said AC source, and
said second circuit means includes second diode means, whereby said second diode means, said second relay winding and said Geiger tube are connected in series to said terminals to energize said second relay winding only during a second half cycle of said AC source when said Geiger tube is conductive.

References Cited
UNITED STATES PATENTS

| 2,935,660 | 5/1960 | Patchell | 317—123 X |
| 3,189,743 | 6/1965 | Johnson et al. | 250—83.6 |
| 3,252,058 | 5/1966 | Close | 317—148.5 |
| 3,258,758 | 6/1966 | Byrd | 250—83.3 X |
| 3,320,602 | 5/1967 | Andrews | 340—233 |

ARCHIE R. BORCHELT, *Primary Examiner.*